(12) United States Patent
Houze et al.

(10) Patent No.: US 11,228,628 B2
(45) Date of Patent: Jan. 18, 2022

(54) METHOD AND DEVICE FOR DOWNLOADING AUDIOVISUAL CONTENT

(71) Applicant: ORANGE, Issy-les-Moulineaux (FR)

(72) Inventors: Patrice Houze, Chatillon (FR);
Emmanuel Mory, Chatillon (FR);
Sylvain Kervadec, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/626,461

(22) PCT Filed: Jun. 21, 2018

(86) PCT No.: PCT/FR2018/051503
§ 371 (c)(1),
(2) Date: Dec. 24, 2019

(87) PCT Pub. No.: WO2019/002729
PCT Pub. Date: Jan. 3, 2019

(65) Prior Publication Data
US 2020/0228582 A1 Jul. 16, 2020

(30) Foreign Application Priority Data
Jun. 27, 2017 (FR) ...................................... 1755913

(51) Int. Cl.
*H04L 29/06* (2006.01)
(52) U.S. Cl.
CPC ...... *H04L 65/4084* (2013.01); *H04L 65/4023* (2013.01); *H04L 65/608* (2013.01)
(58) Field of Classification Search
CPC ............. H04L 65/4084; H04L 65/4023; H04L 65/608; H04L 45/00; H04L 69/14; H04N 21/44209; H04N 21/631
(Continued)

(56) References Cited

U.S. PATENT DOCUMENTS

| 7,584,262 B1* | 9/2009 | Wang | H04L 12/4625 709/217 |
| 2003/0065762 A1* | 4/2003 | Stolorz | H04L 67/26 709/223 |

(Continued)

FOREIGN PATENT DOCUMENTS

| EP | 2537340 A1 | 12/2012 |
| EP | 2953319 A1 | 12/2015 |
| WO | 2011101371 A1 | 8/2011 |

OTHER PUBLICATIONS

English translation of the Written Opinion of the International Searching Authority dated Sep. 6, 2018 for corresponding International Application No. PCT/FR2018/051503, filed Jun. 21, 2018.

(Continued)

*Primary Examiner* — Tan Doan
(74) *Attorney, Agent, or Firm* — David D. Brush; Westman, Champlin & Koehler, P.A.

(57) ABSTRACT

A method and a device for downloading an audiovisual content from a data network. A description file describing the sub-dividing of the audiovisual content into a set of segments includes at least two pieces of information representative of respectively two segment download paths, each piece of information representative of a download path being associated with a network interface, and at least two network interfaces being distinct. The downloading device obtains at least one piece of information on distribution of requests for downloading segments by network interface, and for at least one segment of the audiovisual content to be downloaded, it selects a network interface from among the network interfaces associated with the download paths included in the description file, as a function of the information on distribution of requests obtained. A segment download request is then sent via the selected network interface.

13 Claims, 3 Drawing Sheets

(58) Field of Classification Search
USPC .......................................................... 709/219
See application file for complete search history.

(56) References Cited

U.S. PATENT DOCUMENTS

2012/0311174 A1* 12/2012 Bichot ................ H04L 65/4092
709/231
2018/0139254 A1* 5/2018 Oyman .......... H04N 21/234336

OTHER PUBLICATIONS

International Search Report dated Aug. 30, 2018 for corresponding International Application No. PCT/FR2018/051503, filed Jun. 21, 2018.
Written Opinion of the International Searching Authority dated Aug. 30, 2018 for corresponding International Application No. PCT/FR2018/051503, filed Jun. 21, 2018.

* cited by examiner

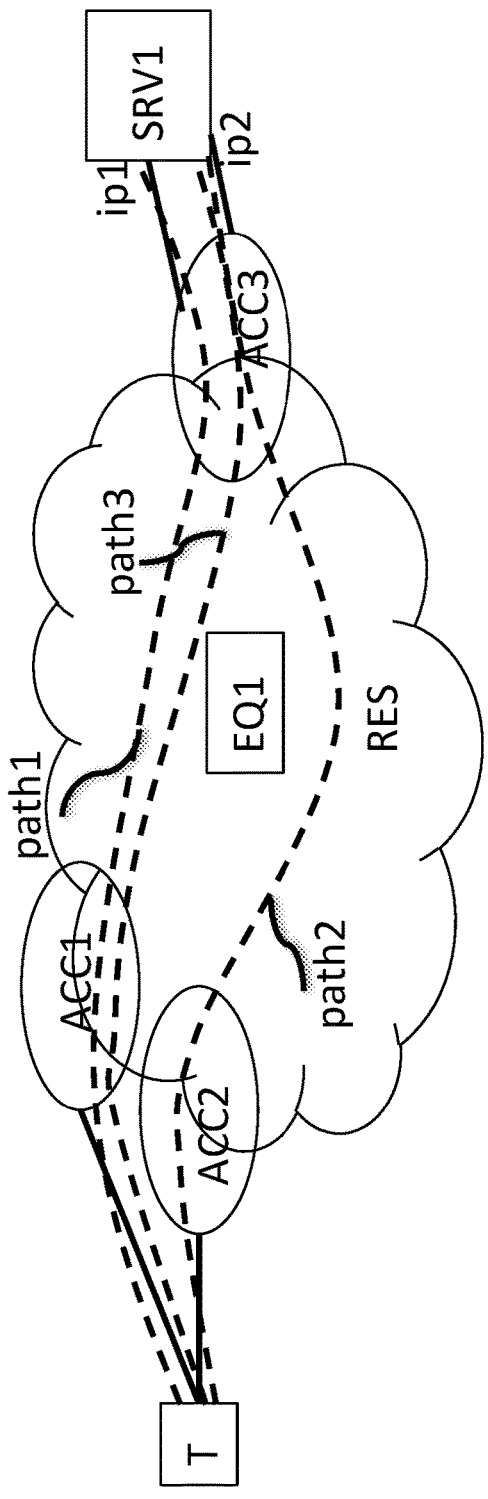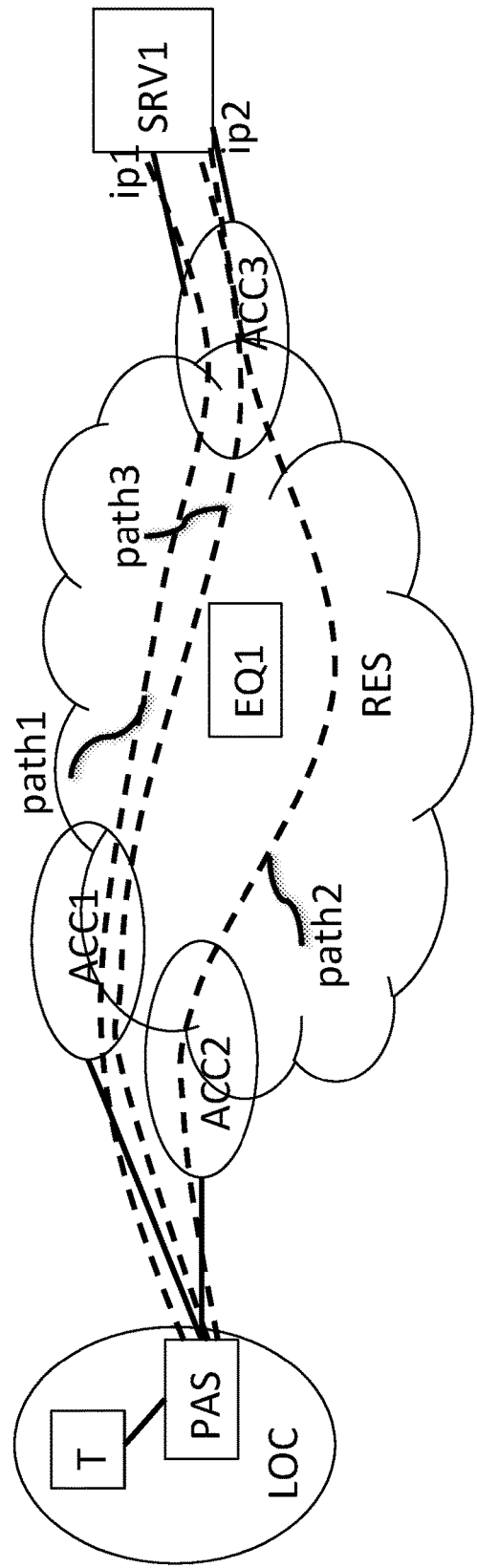
FIG. 1A
FIG. 1B

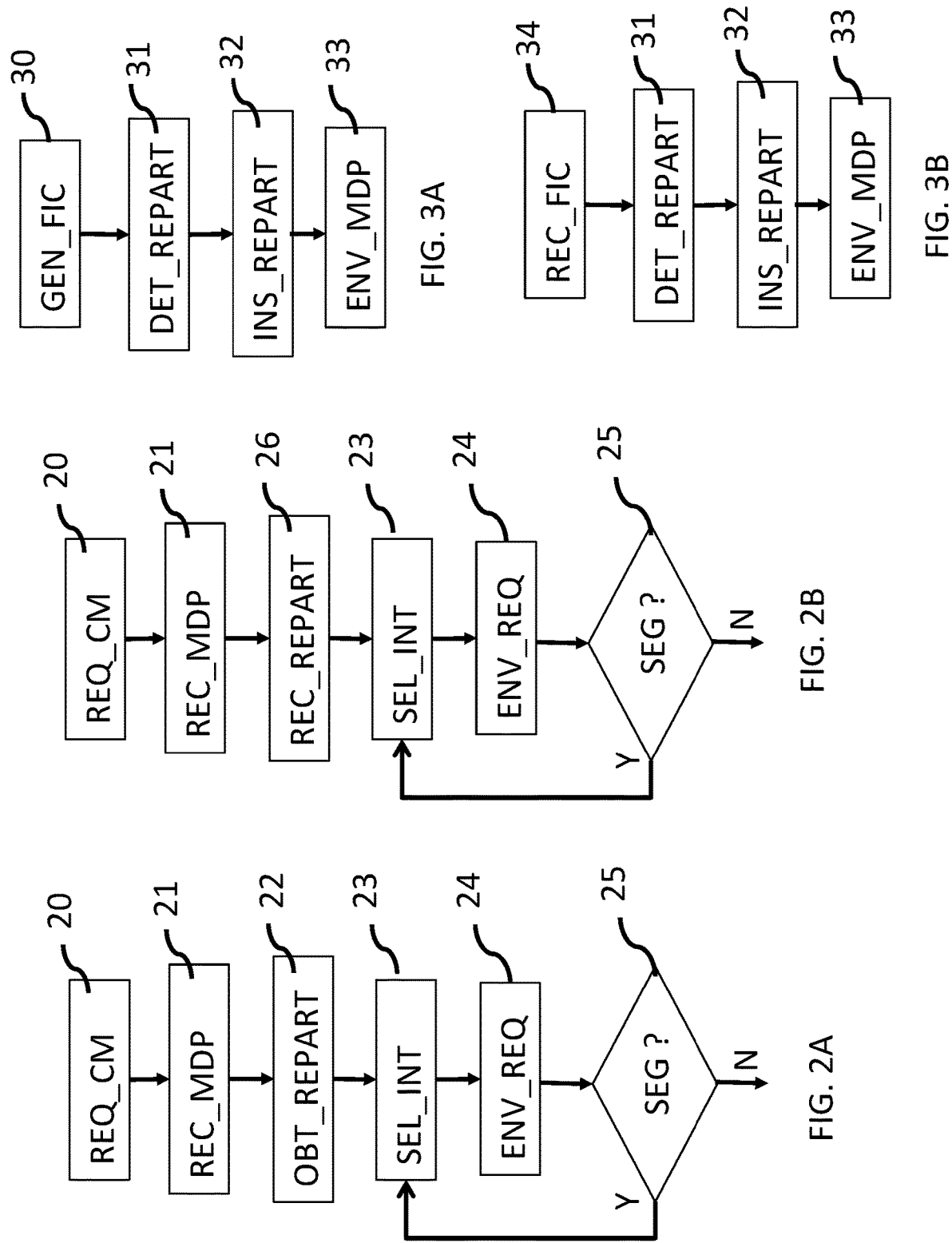

METHOD AND DEVICE FOR DOWNLOADING AUDIOVISUAL CONTENT

CROSS-REFERENCE TO RELATED APPLICATIONS

This Application is a Section 371 National Stage Application of International Application No. PCT/FR2018/051503, filed Jun. 21, 2018, which is incorporated by reference in its entirety and published as WO 2019/002729 A1 on Jan. 3, 2019, not in English.

1. FIELD OF THE INVENTION

The invention relates to the downloading of audiovisual contents through a data network, and more particularly to the downloading of such contents in streaming mode.

2. PRIOR ART

The broadcasting of audiovisual contents in streaming mode on a communications network such as the Internet requires that the broadcast stream should be adapted to the bit-rate or the bandwidth available on the network at a given point in time. To this end, a technique of dynamic adaptive streaming based on the HTTP (Hypertext Transfer Protocol) is used to deliver a prepared content according to different data streams having variable quality and bit rate. This technique has been standardized with the standardization body ISO/IEC MPEG under the name MPEG-DASH (Moving Picture Expert Group—Dynamic Adaptive Streaming over HTTP) but other similar solutions exist, such as for example APPLE HTTP Live Streaming, Microsoft Smooth Streaming or Adobe HTTP Dynamic Streaming. Each content is cut into short-duration segments, generally lasting a few seconds. The organization of the segments and the parameters associated with the segments are published in a file commonly called a manifest. This file in XML (eXtensible Markup Language) format is called MPD or Media Presentation Description according to the MPEG-DASH standard. Other formats can be used, such as for example the text format for a playlist compliant with the HTTP live streaming protocol described in an IETF draft.

"Broadcasting in streaming mode" is understood here to mean the distribution of a content downloaded by a terminal and played by the terminal as and when the segments of the audiovisual content are received. Such a technique is suited especially to the direct retransmission of video streams.

When a terminal equipped with a client compliant with the MPEG-DASH standard downloads an audiovisual content broadcast on the Internet, the terminal typically carries out an estimation of the available bandwidth to receive segments of the audiovisual content and selects the next segment to be downloaded that provides the best possible quality and a segment reception time compatible with the uninterrupted rendering of the audiovisual content.

Most terminals are today equipped with several communications interfaces, also called network interfaces here below, enabling the terminal to set up connections with another terminal or server via different network interfaces. For example, a terminal can receive and send out data via a Wifi interface or a 3G interface. Such terminals can then implement an MPTCP (Multi-Path Transport Control Protocol) technique that enables data exchange during a same session via different network interfaces in using a TCP connection on several network interfaces between the extremities.

According to this technique, called an MPTCP technique, the terminal that exchanges data with another terminal or a server determines only the distribution of the TCP exchanges on the different interfaces available to the terminal. For example, when congestion is detected by the terminal on a particular interface, the terminal implementing the MPTCP protocol reacts, following this detection, by modifying the distribution of TCP exchanges on the different interfaces.

Such a technique is therefore not optimal because the terminal reacts after the detection of a congestion. In the case of the downloading of an audiovisual stream by the terminal, such a behavior can then have an impact on the quality of rendering of the audiovisual stream.

3. SUMMARY OF THE INVENTION

The invention improves the prior art. It relates to a method for downloading an audiovisual content from a data network, implemented by a terminal. According to the invention, a description file describing a sub-dividing of the audiovisual content into a set of segments is received by the terminal. Such a description file comprises at least two pieces of information representative of respectively two segment download paths, each piece of information representative of a download path being associated with a network interface and at least two network interfaces being distinct.

The terminal obtains at least one piece of information on the distribution of requests for downloading segments by network interface and, for at least one segment of the audiovisual content to be downloaded, a network interface of the terminal is selected from among the network interfaces associated with the download paths comprised in the description file, this selection being made as a function of the information on distribution of requests obtained. Such a segment download request is sent via the selected network interface.

The method according to the invention thus enables a terminal to make the most efficient possible use of the network interfaces available to download an audiovisual content in taking account, during the sending of segment download requests, of a piece of information on distribution by network interface.

According to the invention, the terminal is informed of the possibility of using several paths to download an audiovisual content via a piece of information comprised in the description file of the audiovisual content, for example the manifest of the MPEG-DASH standard.

The term "download path" is understood to mean the network path by which the segments travel in transit to go from the distribution server to the terminal. Such a network path includes among others a URL enabling access to a distribution server.

The term "segment" is understood here to mean equally well a segment of an audiovisual content and a fragment of a segment of an audiovisual content, also known as a "byte-range" in the MPEG-DASH standard.

According to the invention, the network path specified in the description file is associated implicitly or explicitly with a network interface, i.e. a technology (3G, 4G, WIFI, DSL, etc.) implemented by the network interface used to access the data network. Such an association can be implicit, for example it can be deduced from the IP address of the distribution server, or else it can be explicit in specifying a network interface identifier for example.

The distribution of the download requests on the different interfaces is further carried out at the application level by the terminal and no longer at the transport level as is the case for the MPTCP. Advantageously, multipath downloading is also possible for requests according to the HTTPS protocol.

According to one particular embodiment of the invention, the at least one piece of information on distribution of requests for downloading segments by network interface is obtained from an apparatus of the data network.

According to this particular embodiment of the invention, the pieces of information on distribution of the requests for downloading segments by network interface are provided to the terminal. Thus, the terminal does not determine anymore the distribution of the requests for downloading by network interface on its own. A particular embodiment such as this enables a distribution by network interface that is proactive and no longer reactive as in the prior art.

For example, such pieces of information on distribution are provided by the operator of the network or the broadcaster of the audiovisual content. These entities can also control the use of the network resources and of the access points for the downloading of the audiovisual content and anticipate problems of congestion, for example an increase in load on an access point. According to another variant, such pieces of information on distribution are provided by apparatuses spliced into the content distribution chain in the data network. Such devices have information on optimal distribution and can thus enrich the description file with information on distribution.

According to another particular embodiment of the invention, the at least two pieces of information respectively representative of two download paths are comprised respectively in a "BaseURL" field of the description file according to the MPEG-DASH standard.

Advantageously, the use of the "BaseURL" field of the MPEG-DASH manifest to specify the different possible download paths gives a description file compatible with the terminals that do not implement the downloading method according to the invention. Thus, such terminals can however download the audiovisual streams by using the field specified in the first "BaseURL" field encountered in the description file.

According to another particular embodiment of the invention, the information on distribution of the requests for downloading segments by network interface is comprised in the description file received.

According to another particular embodiment of the invention, the information on distribution of the requests for downloading segments by network interface is a parameter of a "BaseURL" field of the description file received.

For example, according to this particular embodiment of the invention, a rough distribution of segment downloads can be provided in terms of percentage of segments to be downloaded on each network interface.

According to another particular embodiment of the invention, the information on distribution of the requests for downloading segments by network interface is represented for each segment by a list of byte-ranges of the audiovisual content, each byte-range being associated with a download path.

For example, according to this particular embodiment of the invention, a fine distribution of the downloads of segments is provided.

According to another particular embodiment of the invention, the information on distribution of the requests for downloading segments by network interface is obtained via an exchange of messages between a server of the data network and the terminal according to the SAND (Server And Network Assisted DASH) mechanism of the MPEG-DASH standard.

According to this particular embodiment of the invention, the information on distribution of downloads of the segments by network interface is obtained dynamically, without requiring the sending of a new description file.

The invention also relates to a device for downloading an audiovisual content from a data network, comprising a processor configured to:
  receive a description file describing a sub-dividing of the audiovisual content into a set of segments, the description file comprising at least two pieces of information respectively representative of two segment download paths, each piece of information representative of a download path being associated with a network interface,
  obtaining at least one piece of information on distribution of requests for downloading segments by network interface,
  for at least one segment of the audiovisual content to be downloaded:
    select, as a function of the information on distribution of download requests obtained and of at least two pieces of information respectively representative of two segment download paths, a network interface through which a request for downloading said segment is intended to be sent out,
    transmit said download request to a transmission device adapted to sending out a download request via the selected network interface.

According to another particular embodiment of the invention, the transmission device is comprised in the downloading device and at least two network interfaces adapted to receiving and sending out data from and to the data network are comprised in the downloading device.

The invention also relates to a downloading terminal comprising a downloading device according to any one of the particular embodiments described here above.

The invention also relates to a method for providing a piece of multipath downloading information for downloading an audiovisual content sub-divided into segments. According to such a method, a descriptive file of the audiovisual content is generated, such a file comprising at least two pieces of information respectively representative of two segment download paths, each piece of information representative of a download path being associated with a network interface and at least two network interfaces being distinct. The at least two pieces of information representative of two segment download paths enable a terminal, depending on a piece of information on the distribution of download requests obtained by the terminal, to select a network interface through which a request for downloading a segment is intended to be issued by said terminal. The description file generated is sent to the terminal.

The invention also relates to a device for providing a piece of information on multipath downloading of an audiovisual content sub-divided into segments, the providing device comprising a processor configured to transmit the following to a terminal:
  a description file comprising at least two pieces of information respectively representative of two segment download paths, each piece of information representative of a download path being associated with a network interface,
  the at least two pieces of information representative of two paths for downloading segments enabling the terminal to select, as a function of a piece of information on distribution of download requests obtained by the terminal, a network interface through which a request for downloading a segment is intended to be sent out by said terminal.

According to one particular embodiment of the invention, the providing device here above is also configured to transmit said information on distribution of requests for downloading segments by network interfaces to the terminal.

The invention also relates to a method for providing a piece of information on distribution of requests for downloading an audiovisual content sub-divided into segments. According to such a method for providing a piece of information on distribution, pieces of information on distribution of download requests for downloading segments by network interface are determined by a device for providing a piece of information on distribution and are transmitted to a terminal suited to downloading said audiovisual content. Thus, such pieces of distribution information enable the terminal to select a network interface via which a request for downloading a segment is to be transmitted by said terminal.

The invention also provides a device for providing a piece of information on distribution of requests for downloading an audiovisual content sub-divided into segments. Such a device for providing a piece of distribution information is configured to transmit, to a terminal adapted to downloading said audiovisual content, pieces of information on distribution of requests for downloading segments by network interface, enabling the terminal to select a network interface through which a request for downloading a segment is intended to be sent out by said terminal.

Advantageously, such a device for providing information on distribution is spliced into a network's distribution chain for audiovisual content distribution.

The invention also relates to a computer program comprising instructions to implement the method for downloading according to any one of the particular embodiments described here above when said program is executed by a processor. The method of downloading according to the invention can be implemented in various ways, especially in wired form or in software form.

The invention also relates to a computer program comprising instructions to implement the method for providing a piece of multipath downloading information for downloading an audiovisual content according to any one of the particular embodiments described here above, when said program is executed by a processor. The method for providing a piece of multipath downloading information for downloading an audiovisual content according to the invention can be implemented in various ways, especially in wired form or in software form.

The invention also relates to a computer program comprising instructions to implement the method for providing a piece of information on distribution of requests for downloading an audiovisual content according to any one of the particular embodiments described here above, when said program is executed by a processor. The method for providing a piece of information on distribution of requests for downloading an audiovisual content according to the invention can be implemented in various ways, especially in wired form or in software form.

These programs can use any programming language whatsoever and can be in the form of source code, object code or intermediate code between source code and object code such as in a partially compiled form or in any other desirable form whatsoever.

The invention is also aimed at providing a recording medium or information medium readable by a computer, and comprising instructions of a computer program as mentioned here above. The recording media mentioned here above can be any entity or device whatsoever capable of storing the program. For example, the medium can comprise a storage means such as a ROM, for example, a CD ROM or microelectronic circuit ROM or again a magnetic recording means, for example a floppy disk or a hard disk drive. Besides, the recording media can correspond to a transmissible medium such as an electrical or optical signal, that can be conveyed by an electrical or optical cable, by radio or by other means. The programs according to the invention can especially be uploaded to an Internet type network.

As an alternative, the information media can correspond to an integrated circuit into which the program is incorporated, the circuit being adapted to executing or to being used in the execution of the method in question.

4. LIST OF FIGURES

Other features and advantages of the invention shall appear more clearly from the following description of particular embodiments, given by way of simple, illustratory and non-exhaustive examples and from the appended drawings, of which:

FIG. 1A illustrates an environment of implementation according to a particular embodiment of the invention;

FIG. 1B illustrates an environment of implementation according to another particular embodiment of the invention;

FIG. 2A illustrates steps of the downloading method according to a particular embodiment of the invention;

FIG. 2B illustrates steps of the downloading method according to another particular embodiment of the invention;

FIG. 3A illustrates steps of the method for providing a piece of information on multipath downloading of an audiovisual content according to a particular embodiment of the invention;

FIG. 3B illustrates the steps of a method for providing pieces of information on distribution of download requests according to a particular embodiment of the invention;

Figure 4A:
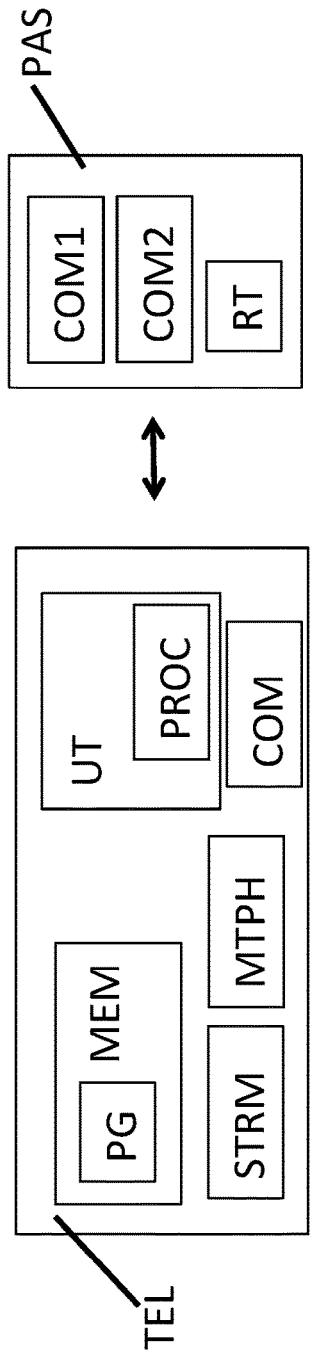
FIG. 4A illustrates a downloading system configured to implement the downloading method according to a particular embodiment of the invention.

5. DESCRIPTION OF AN EMBODIMENT OF THE INVENTION 5.1 General Principle

According to the invention, when a terminal is streaming a multimedia content, for example a film, or a television stream or the like, this terminal can retrieve the segments of the multimedia contents via different communications paths associated with different network interfaces available on the terminal. The selection of a network interface to obtain a particular segment is carried out by the terminal using information on distribution of the requests for downloading by network interface that are obtained by the terminal.

Such information on distribution of requests for downloading can be determined as a function of network performance values, for example the use of the bandwidth of a network related to a particular network interface, or the load of the apparatuses of the network.

Such information on distribution of download requests can be determined by the terminal itself. For example, the terminal makes a measurement on each interface of the time taken to download the requested data segment and, from this, it deduces the useful bit-rate associated with the interface. It can thus make a distribution by comparing the useful bit-rate of each interface. In this example, the pieces of information on distribution are determined relative to the network information obtained by an applications level (HTTP level) of the terminal.

According to another example, the terminal possesses a lower-level module (TCP, IP, or even a physical layer) that sends back finer network information such as loss rate, stability, etc. to the applications level (http) of the terminal.

According to yet another example, the terminal has a module called an "edge controller" that is a module driven by the EDGE network, a higher-level controller of the network sending the terminal specifications on the use of the different access networks.

According to another particular embodiment of the invention, the terminal can receive such information on distribution of requests for downloading by network interface coming for example from a device of a data network. The terminal thus has distribution information determined as a function of network information that it normally does not know and the downloading of segments of the multimedia content by the terminal is thus optimized.

In addition, information on distribution by network interface can be associated with a profile. For example, these items of information can be dependent on a criterion of efficiency. For example, a set of pieces of information on distribution by network interface can be associated with a "low delay" profile according to which the distribution will be such that it optimizes the downloading time to limit the delay for live audiovisual contents for example.

A set of pieces of information on distribution by network interface can be associated with a "high reliability" profile according to which the distribution would be such that it gives preference to the most reliable networks for downloading.

A set of pieces of information on distribution by network interface can be associated with a "high bit-rate" profile according to which the distribution would be such that it maximizes the aggregate bandwidth, i.e. the bandwidth on the different networks used for the downloading.

A set of pieces of information on distribution by network interface can be associated with a "tile priority" according to which the distribution would be such that it gives preference to the downloading of regions of interest of an audiovisual content via optimal download paths. Other types of profiles can also be envisaged.

5.2 Examples of Implementation

FIG. 1A illustrates an environment of implementation according to one particular embodiment of the invention. Such an environment comprises a terminal T configured to download a multimedia content in streaming mode, for example according to the MPEG-DASH protocol, provided by a content distribution server SRV1 via a data network RES of a communications operator. The data network RES is for example an IP network. The data network RES is interconnected with different access networks ACC1, ACC2, ACC3 enabling devices connected to such access networks to use the data network RES to send and receive data.

The server SRV1 accesses the data network RES via an access network ACC3, for example a landline DSL (Digital Subscriber Line) network. The terminal T is capable of accessing a network RES via any one of the network interfaces available on this terminal T. In the example illustrated in FIG. 1A, the terminal T can access the network RES via an access network ACC1, for example a landline DSL network and via an access network ACC2, for example a mobile 4G network.

As illustrated in FIG. 1A, the terminal T can download the segments of the multimedia contents provided by the server SRV1 via several download paths: path1, path2 and path3. To this end, when the terminal T wishes to download a multimedia content, it receives a description file MPD comprising especially an IP address of the server providing the multimedia content. In the example illustrated in FIG. 1A, the segments of the multimedia content can be accessed from the server SRV1 via one of the IP addresses of the server SRV1: ip1 and ip2. Other embodiments are of course possible. For example, several distribution servers are possible or else a single distribution server having a single IP distribution address, etc.

According to the invention, on the basis of the description file, the terminal T identifies, for each download path1, path2, path3, a network interface, i.e. a technology enabling access to the data network associated with the download path.

For example, according to FIG. 1A, the download paths path1 and path2 are associated with the access network ACC1 and the download path path2 is associated with the access network ACC2. This is done so that, to request a segment via the download path, path1 or path 3, the terminal T uses for example a radio network interface for a WIFI access network or an Ethernet network interface for a DSL access network and to request a segment via the download path2, the terminal T uses for example a 4G network interface.

According to the invention, in order to make an optimal selection of a download path to obtain a multimedia content segment, the terminal T obtains information on distribution of download requests. Such information can be provided to it by a device (EQ1) of the data network RES spliced into the content distribution chain or by the server SRV1. The spliced-in device EQ1 is for example a DANE (DASH Aware Network Element) server or a CGW (Convergent Gateway) setting up a convergence between an LTE radio network and a landline network or a UGW (Unified Gateway) used in the 5G networks or again, in the case of a mobile network, an MEC (Mobile Edge Computing) network or EDGE-node.

The terminal T can also itself determine information on distribution, for example from network traffic information sent back to it or from observations on traffic carried out on the different interfaces of the terminal T.

When the terminal T has selected a network interface to send a segment download request, a router module of the terminal T transmits the segment download request via the selected network interface.

According to another particular embodiment of the invention described in FIG. 1B, the router module is not comprised in the terminal T but in another device connected to the terminal T.

The environment illustrated in FIG. 1B is distinguished from the environment illustrated in FIG. 1A in that the terminal T is connected to the data network RES via a routing device PAS, for example a home gateway. The terminal T is for example connected to the gateway PAS via a local area network LOC set up by the gateway PAS, for example a WIFI network. As a variant, the terminal T can be connected by wire to the gateway PAS.

According to the embodiment described in FIG. 1B, the terminal T is for example a video decoder or a connected television set.

According to the embodiment described in FIG. 1B, when the terminal T, using information on the distribution of download requests by interface, selects a network interface to send a request for downloading a segment, the download request comprises a piece of information informing the gateway PAS as to the network interface towards which the download request must be routed.

Here below, we describe the steps of the method for downloading an audiovisual content from a data network according to one particular embodiment of the invention. The method is for example implemented by the terminal T described with reference to FIG. 1A or 1B.

Referring to FIG. 2A, at a step 20, the terminal T sends the contents distribution server SRV1 a request for downloading an audiovisual content. For example, a user of the terminal T views a catalogue of audiovisual contents displayed in a browser on a screen of the terminal T and, via a user interface of the terminal T, selects an audiovisual content in the catalogue. Such a selection of an audiovisual content causes the browser of the terminal T to send a request for downloading audiovisual content to the server SRV1. Classically, the terminal T and the server SRV1 communicate to acknowledge the request from the terminal T and start the distribution of the audiovisual content.

At a step 21, the terminal T receives a file from the server SRV1 which is a description file MPD of the audiovisual content selected.

Such a description file MPD describes the sub-dividing of the audiovisual network into a set of segments which the terminal T must download to be able to play back the audiovisual content.

Such a description file MPD comprises at least two pieces of information respectively representative of two segment download paths, each piece of information representative of a download path being associated with a network interface.

In the example described with reference to FIG. 1A or 1B, the description file MPD comprises three download paths: path1, path2 and path3 indicating a network path to access the server SRV1. The paths path1 and path2 are associated with a network interface enabling access to the access network ACC1 and the download path path2 is associated with a network interface enabling access to the access network ACC2.

Here below, non-exhaustively, we present an example of a description file MPD compliant with the MPEG-DASH standard, in which the association of a network interface with a download path can be specified according to different variants. Naturally, other examples of description files are also possible.

For example, the description file MPD takes the following form:

```
<MPD xmlns="urn:mpeg:dash:schema:mpd:2011" ...>
<Period ...>
<AdaptationSet ...>
<Representation ...>
<BaseURL>http://srv1.monopath.fr/path/</BaseURL>
<BaseURL>http://srv2.monopath.net/path/</BaseURL>
<BaseURL>http://srv1.multipath.path1.fr?path-DSL-
@ip=167.105.177.6&percent=25/</BaseURL>
<BaseURL>http://srv1.multipath.path2.fr?path-4G-
@ip=10.127.4.54&percent=60/</BaseURL>
<BaseURL>http://srv1.multipath.path3.fr?path-DSL-
@ip=10.127.4.54&percent=15/</BaseURL>
<SegmentList timescale="90000" duration="5400000">
<RepresentationIndexsourceURL="representation-index.sidx"/>
<SegmentURL media="segment-1.ts"/>
<SegmentURL media="segment-2.ts"/>
<SegmentURL media="segment-3.ts"/>
<SegmentURL media="segment-4.ts"/>
<SegmentURL media="segment-5.ts"/>
<SegmentURL media="segment-6.ts"/>
<SegmentURL media="segment-7.ts"/>
<SegmentURL media="segment-8.ts"/>
<SegmentURL media="segment-9.ts"/>
<SegmentURL media="segment-10.ts"/>
...
</SegmentList>
</Representation>
</AdaptationSet>
</Period>
</MPD>
```

According to the exemplary description file here above, the segments of the audiovisual content can be downloaded from the server SRV1 or a server SRV2 via the URLs (Uniform Resource Locators) specified in the "BaseURL" fields of the file.

The list of the segments of the audiovisual content to be downloaded is specified by means of "SegmentList" tags.

According to the example described here, a network interface is associated implicitly with each download path as a parameter of the URL.

As a variant, the network interface can be associated with each download path explicitly, using a new dedicated tag of the description file MPD, for example by adding, for each download path, a BaseUrl=eth0://resource type field where eth0 corresponds to the network interface associated with the "resource" download path.

Advantageously, according to the invention, a terminal that is not compatible with the downloading of segments of the audiovisual content via several download paths could nevertheless use the MPD description file received to send out segment download requests. Indeed, such a terminal will for example read the first or second "BaseURL" field specified in such a description file and will use the download path indicated in this field.

At a step 22, the terminal T obtains at least one piece of information on the distribution of requests for downloading segments by network interface.

According to the particular embodiment of the invention described here, the information on distribution by interface are provided in terms of parameters of the URL, download paths for example in the form of percentage. For example, for the file MPD here above:

The path path1 must be used for 25% of the download requests, the path path2 must be used for 60% of the download requests, the path path3 must be used for 15% of the download requests.

According to another variant, the description file MPD can be of the following form:

```
<MPD xmlns="urn:mpeg:dash:schema:mpd:2011" ...>
<Period ...>
<AdaptationSet ...>
<Representation ...>
<BaseURL>http://server1.monopath.fr/path/</BaseURL>
<BaseURL>http://server2.monopath.net/path/</BaseURL>
<BaseURL>http://server1.multipath.path1.fr?path-DSL-@ip=167.105.177.6/</BaseURL>
<BaseURL>http://server1.multipath.path2.fr?path-4G-@ip=10.127.4.54/</BaseURL>
<BaseURL>http://server1.multipath.path3.fr?path-DSL-@ip=10.127.4.54/</BaseURL>
<SegmentList ...> ...
<SegmentURL media="path/segment1.m4s mediaRange="1305-25305" indexRange-path1="1305-9678" indexRange-path2="9679-19876" indexRange-path3="19877-25305"/>
<SegmentURL media="path/segment2.m4s mediaRange="25306-49306" indexRange-path1="25306-29875" indexRange-path2="29876-37860" indexRange-path3="37861-49306"/>
<SegmentURL media="path/segment3.m4s mediaRange="49307-60512" indexRange-path1="49307-52741" indexRange-path2="52741-60512"/>
..
</SegmentList>
</Representation>
</AdaptationSet>
</Period>
  </MPD>

...
</SegmentList>
</Representation>
</AdaptationSet>
</Period>
  </MPD>
```

According to this variant, the pieces of information on distribution of requests for downloading segments by network interface are provided in specifying, for each segment to be downloaded, a list of byte ranges of the audiovisual content, and for each byte range of the segment, the associated download path.

For example, for the segment "segment1.m4s", the first byte range of 1305-9678 should be requested via the download path path1, the second byte interval of 9679-19876 should be requested via the download path path2, and the third byte range of 19877-25305 should be requested via the download path path3.

According to another variant, the description file MPD is in what is called a template segment mode and may be of the following form:

According to this variant, the terminal T must itself generate the URLs through which it can download the segments of the audiovisual content in using the model or template defined in the "SegmentTemplate" field. According to this variant, the pieces of information on distribution by interface are provided in a "MultipathTemplate" field in the form of percentages associated with each downloading field. This way of providing distribution information by interface can also be used when the description file MPD comprises the list of segments with the "SegmentList" field as illustrated with the first example of a file here above. In the same way, the information on distribution by interface can be provided in the MPD file in segment template mode as a parameter of the "BaseURL" fields as described with the first example of a file here above.

At a step 23, the terminal T, on the basis of the description file, determines the segment of the audiovisual content to be

```
    </Representation>
<MPD xmlns="urn:mpeg:dash:schema:mpd:2011" ...>
<Period ...>
<AdaptationSet ...>
<Representation ...>
<BaseURL>http://server1.monopath.fr/path/</BaseURL>
<BaseURL>http://server2.monopath.net/path/</BaseURL>
<BaseURL>http://server1.multipath.path1.fr?path-DSL-@ip=167.105.177.6/</BaseURL>
<BaseURL>http://server1.multipath.path2.fr?path-4G-@ip=10.127.4.54/</BaseURL>
<BaseURL>http://server1.multipath.path3.fr0path-DSL-@ip=10.127.4.54/</BaseURL>
<SegmentTemplate media="segment-$Number$.m4s" timescale="90000">
<MultipathTemplate mediaRange-path1="%25" mediaRange-path2="%60" mediaRange-path3="%15">
</MultipathTemplate>
<SegmentTimeline>
<S t="0" r="100" d="5400000"/>
</SegmentTimeline>
</SegmentTemplate>
...
</Representation>
</AdaptationSet>
</Period>
  </MPD>
``` downloaded and for this segment selects a terminal network interface T among the network interfaces associated with the download paths. Such a selection is made according to the information on distribution of requests obtained during the step 22. When the segment to be downloaded is not the first segment to be downloaded, at the step 23, the terminal T also takes account of the network interfaces selected for the preliminarily sent download requests in order to comply with the distribution of the requests obtained.

At a step 24, the terminal T sends a request for downloading the segment of the audiovisual content to be downloaded via the network interface selected during the step 23.

At a step 25, the terminal T verifies whether other segments of the audiovisual content must be downloaded. If this is the case (Y), the procedure resumes at the step 23. Else, if all the segments of the audiovisual content have been downloaded, or if the user has asked for the stopping of the viewing of the audiovisual content, the downloading comes to an end.

FIG. 2B illustrates another particular embodiment of the invention. The steps identified with the same references as FIG. 2A are identical to those described with reference to FIG. 2A.

According to the particular embodiment of the invention described in FIG. 2B, the pieces of information on distribution are provided at a step 26, by exchanges of messages between the terminal T and the server SRV1. For example, such messages can be exchanged according to the SAND (Server And Network Assisted DASH) standard, defined in the ISO/IEC 23009-5 standard. Such messages can be XML messages, exchanged according to the HTTP protocol or any other.

As described further above, the information on distribution can be provided in the form of percentage or else a network interface is specified for each segment, or for each segment interval or range.

According to one variant of any one of the particular embodiments of the invention described here above, the pieces of information on distribution provided by the terminal T can be updated by sending either a new MPD description file to the terminal T or new SAND messages.

FIG. 3A illustrates steps of the method for providing a piece of information on multipath downloading of an audiovisual content according to one particular embodiment of the invention. For example, such a method is implemented by the server SRV1 illustrated in FIGS. 1A and 1B.

At a step 30, following the request for downloading an audiovisual content sent by the terminal T, the server SRV1 generates a description file of the audiovisual content. A piece of information indicating to the terminal to which such a file is addressed that the segments of the audiovisual content can be obtained by multipath downloading, i.e. using different networks, is inserted into the description file. The generated description file then comprises at least two pieces of information respectively representative of two segment download paths, and each piece of information representative of a download path is associated with a network interface.

According to one particular embodiment of the invention, at a step 31, the server SRV1 determines the distribution by network interface of requests for downloading that the terminal T must implement to download the audiovisual content. For example, the server SRV1 obtains a piece of information on the use of network resources and the load coming from network devices RES. The server SRV1 determines the distribution by network interface as a function of these pieces of information.

At a step 32, the server SRV1 inserts the pieces of information on distribution into the description file MPD of the audiovisual content asked for by the terminal T. The pieces of information on distribution can be inserted into the file according to any one of the examples described here above with reference to FIG. 2A.

At a step 33, the server SRV1 sends the terminal T the description file.

According to another embodiment of the invention described with reference to FIG. 3B, the pieces of information on distribution of download requests are provided by a device EQ1 of the data network RES, spliced into the audiovisual content distribution chain as shown in FIG. 1A et 1B.

According to this particular embodiment of the invention, after the server SRV1 has sent the description file to the terminal T, the device EQ1 receives it at a step 34.

At the step 31, similar to that of FIG. 3A, the device EQ1 determines the pieces of information on distribution as a function of the load of the devices of the network and of the traffic of the data network RES, and of the access networks ACC1, ACC2, and at the step 32 similar to that of FIG. 3A, it modifies the received description file MPD to insert information on distribution by network interface of requests for downloading, according to any one of the examples described here above with reference to FIG. 2A.

Figure 3C:
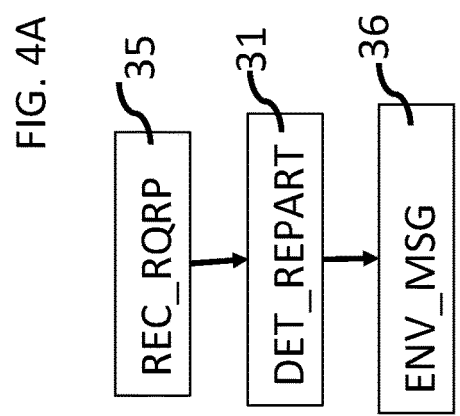
FIG. 3C illustrates steps of the method for providing pieces of information on distribution of download requests according to another particular embodiment of the invention.

FIG. 3C illustrates the steps of the method for providing information on distribution of download requests according to another particular embodiment of the invention. According to this particular embodiment of the invention, the steps of the method can be implemented by the server SRV1 or by a device EQ1 of the network RES.

According to this particular embodiment of the invention, the pieces of information on distribution by network interface are provided to the terminal T via the exchange of SAND messages.

At a step 35, when the terminal T detects, via the description file MPD, that the segments of the audiovisual content can be downloaded via several download paths, the terminal T sends the server SRV1 or the device EQ1 a distribution request to obtain information on distribution by network interface. Such a request is sent according to the exchanges of SAND messages.

At a step 31, similar to that described with reference to FIG. 3A or 3B, the pieces of information on distribution are determined.

At a step 36, the server SRV1 of the device EQ1 sends a SAND message to the terminal T comprising the determined pieces of information on distribution.

During the downloading of the segments of the audiovisual content, the server SRV1 or the device EQ1 can send a new SAND message containing new pieces of information on distribution, for example following the detection of an increase in the load of the network, so as to avoid congestion.

FIG. 4A illustrates a downloading system configured to implement the method of downloading according to any one of the particular embodiments of the invention described here above.

According to one particular embodiment of the invention, the downloading system has a downloading device TEL, for example the terminal T described with reference to FIG. 1B and a router PAS. The downloading device TEL has the classic architecture of a computer and comprises especially a memory MEM, a processing unit UT, equipped for example with a processor PROC and driven by the computer program PG stored in a memory MEM. The computer program PG comprises instructions to implement the steps of the method of downloading as described here above, when the program is executed by the processor PROC.

At initialization, the computer program code instructions PG are for example loaded into a memory RAM and then executed by the processor PROC. The processor PROC of the processing unit UT implements especially the steps of the method of downloading described with reference to FIG. 2A or 2B according to the instructions of the computer program PG.

The downloading device TEL comprises especially a network interface COM enabling the downloading device TEL to communicate with the router PAS and send it segment download requests for downloading segments of an audiovisual content.

The router PAS comprises especially at least two network interfaces COM1, COM2 adapted to accessing a data network and transmitting data on this network. Each network interface COM1, COM2 is specific to the access network to which it enables access. The router PAS also comprises routing tables RT configured to redirect a download request towards a network interface COM1 or COM2 as a function of the IP destination address comprised in the request.

According to another embodiment of the invention, the steps of the downloading method are implemented by functional modules. To this end, the downloading device TEL comprises in addition:
  a streaming module DASH STRM adapted to determining segments of the audiovisual content to be downloaded at a given point in time,
  a multipath module MTPH adapted to selecting a network interface to be used to transmit a download request for downloading a segment as a function of distribution information received.

The communications module COM is also configured to receive data from the data network RES via the router PAS and especially a description file for an audiovisual content to be downloaded.

The processing unit UT cooperates with the different functional modules described here above and the memory MEM in order to implement the steps of the downloading method.

The different functional modules described here above may be in hardware and/or software form. In software form, such a functional module can include a processor, a memory and program code instructions to implement the function corresponding to the module when the code instructions are executed by the processor of the module. In hardware form, such a functional module can be implemented by any type of adapted circuit.

Classically, the downloading device TEL is configured to carry out the rendering of the audiovisual content as and when segments from the network RES are received.

Figure 4B:
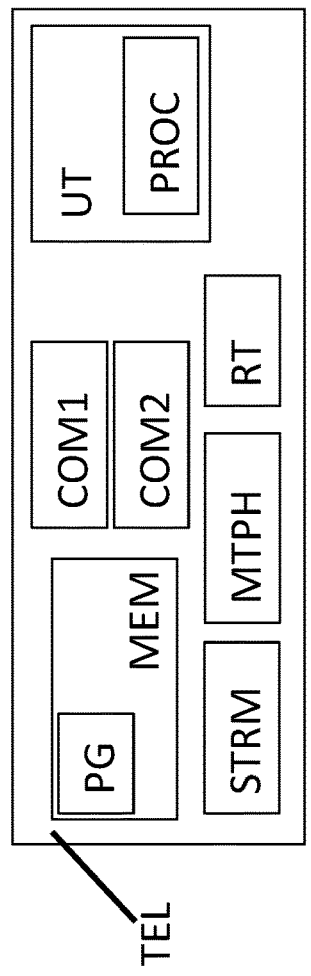
FIG. 4B illustrates a downloading device configured to implement the downloading method according to a particular embodiment of the invention

FIG. 4B illustrates a downloading device TEL configured to implement the downloading method according to any one of the particular embodiments of the invention described here above. According to this particular embodiment of the invention, the routing function for routing download requests is implemented by the downloading device TEL. The downloading device TEL corresponds for example to the terminal T described with reference to FIG. 1A. It has the same characteristics as those described with reference to FIG. 4A.

In addition, the downloading device TEL comprises at least two network interfaces COM1, COM2 adapted to accessing a data network and transmitting data on this network. Each network interface COM1, COM2 is specific to the access network to which it enables access. The downloading device TEL also comprises routing tables RT configured to redirect a download request to one network interface COM1 or COM2 as a function of the destination IP address comprised in the request.

Figure 5:
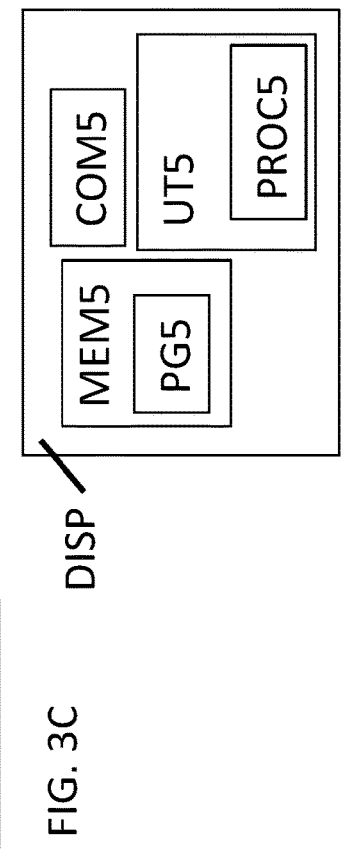
FIG. 5 illustrates a device for providing a piece of information on multipath downloading of an audiovisual content according to a particular embodiment of the invention.

FIG. 5 illustrates a device DISP for providing a piece of information on the multipath downloading of an audiovisual content according to one particular embodiment of the invention and according to any one of the particular embodiments of the invention described here above.

According to one particular embodiment of the invention, the device DISP5 has the classic architecture of a computer and comprises especially a memory MEM5, a processing unit UT5, equipped for example with a processor PROC5 and driven by the computer program PG5 stored in memory MEM5. The computer program PG5 comprises instructions to implement the steps of the method for providing a piece of information on multipath downloading of an audiovisual content as described here above, when the program is executed by the processor PROC5.

At initialization, the computer program code instructions PG5 are for example loaded into a memory RAM and then executed by the processor PROC5. The processor PROC5 of the processing unit UT5 implements especially the steps of the method for providing a piece of information on multipath downloading of an audiovisual content described with reference to FIG. 3A according to the instructions of the computer program PG5.

The device DISP also comprises a communications interface COMS enabling the device to communicate via the data network RES and especially to transmit the description file for the audiovisual content. According to one particular embodiment of the invention, the communications interface COMS also enables the device to transmit distribution information to a downloading device.

According to one particular embodiment of the invention, the device DISP described here above is comprised in a contents distribution server SERV1.

Figure 6:
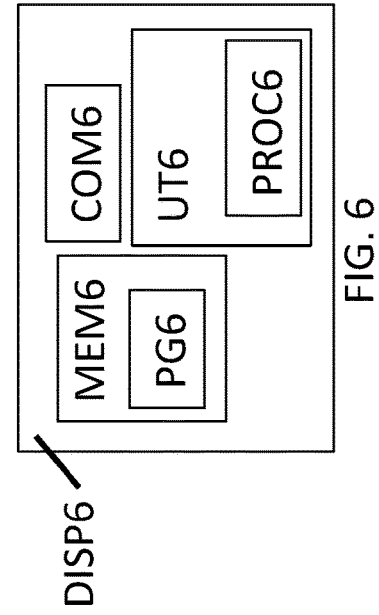
FIG. 6 illustrates a device for providing information on distribution of download requests according to a particular embodiment of the invention.

FIG. 6 illustrates a device DISP6 for providing a piece of information on distribution of download requests for downloading an audiovisual content according to any one of the particular embodiments of the invention described here above.

According to one particular embodiment of the invention, the device DISP6 has the classic architecture of a computer and comprises especially a memory MEM6, a processing unit UT6, equipped for example with a processor PROC6 and driven by the computer program PG6 stored in memory MEM6. The computer program PG6 comprises instructions to implement the steps of the method for providing a piece of information on the distribution of downloading requests as described here above, when the program is executed by the processor PROC6.

At initialization, the computer program code instructions PG6 are for example loaded into a memory RAM and then executed by the processor PROC6. The processor PROC6 of the processing unit UT6 implements especially the steps of the method for providing a piece of information on the distribution of downloading requests described with reference to any one of the figures FIG. 3B or 3C according to the instructions of the computer program PG6.

The device DISP6 also comprises a communications interface COM6 enabling the device to communicate via the data network RES and especially to transmit information on sharing to a downloading device.

According to one particular embodiment of the invention, the device DISP6 described here above is comprised in an EQ1 device of the data network, as shown in FIGS. 1A and 1B.

The invention claimed is:

1. A method for downloading an audiovisual content from a data network implemented by a terminal and comprising the following acts:
   receiving a description file describing a sub-dividing of the audiovisual content into a set of segments, the description file comprising at least two pieces of information representative of respectively two segment download paths, each piece of information representative of a download path being associated with a network interface, at least two of the network interfaces being distinct,
   obtaining at least one piece of information on distribution of requests for downloading segments of the audiovisual content by network interface, which is obtained from an apparatus of the data network, and said piece of information on distribution of requests for downloading segments by network interface indicating for each network interface a proportion of requests for downloading segments to be transmitted by said terminal via said network interface to anticipate traffic congestion on said download path; and
   for at least one segment of the audiovisual content to be downloaded:
      selecting a network interface of the terminal from among the network interfaces associated with the download paths comprised in the description file, as a function of the information on distribution of requests obtained, and
      sending a request for downloading said segment via the selected network interface.

2. The method for downloading an audiovisual content according to claim 1, wherein the at least two pieces of information respectively representative of two download paths are comprised respectively in a "BaseURL" field of the description file according to the MPEG-DASH standard.

3. The method for downloading an audiovisual content according to claim 2, wherein the information on distribution of the requests for downloading segments by network interface is a parameter of a "BaseURL" field of the description file received.

4. The method for downloading an audiovisual content according to claim 2, wherein the information on distribution of the requests for downloading segments by network interface is represented for each segment by a list of byte-ranges of the audiovisual content, each byte-range being associated with a download path.

5. The method for downloading an audiovisual content according to claim 1, wherein the information on distribution of the requests for downloading segments by network interface is obtained via an exchange of messages between a server of the data network and the terminal according to the SAND (Server And Network Assisted DASH) mechanism of the MPEG-DASH standard.

6. A device for downloading an audiovisual content from a data network, comprising:
   a processor configured to:
      receive a description file describing a sub-dividing of audiovisual content into a set of segments, the description file comprising at least two pieces of information respectively representative of two segment download paths, each piece of information representative of a download path being associated with a network interface, at least two of the network interfaces being distinct,
      obtain at least one piece of information on distribution of requests for downloading segments of the audiovisual content by network interface, which is obtained from an apparatus of the data network, and said piece of information on distribution of requests for downloading segments by network interface indicating for each network interface a proportion of requests for downloading segments to be transmitted via said network interface to anticipate traffic congestion on said download path, and
      for at least one segment of the audiovisual content to be downloaded:
         select, as a function of the information on distribution of download requests obtained and of at least two pieces of information respectively representative of two segment download paths, a network interface through which a request for downloading said segment is intended to be sent out,
         transmit said download request to a transmission device adapted to sending out a download request via the selected network interface.

7. The device for downloading an audiovisual content according to claim 6, further comprising the transmission device and at least two network interfaces adapted to receiving and sending out data from and to the data network.

8. The device according to claim 6, wherein the device is implemented in a terminal.

9. A method for providing a piece of information on multipath downloading of an audiovisual content sub-divided into segments, the method for providing comprising the following acts performed by a providing device:
   generating a description file of said audiovisual content comprising:
      at least two pieces of information respectively representative of two segment download paths, each piece of information representative of a download path being associated with a network interface, at least two of the network interfaces being distinct, so that the at least two pieces of information representative of two download paths enable a terminal, as a function of at least one piece of information on distribution of download requests, to select a network interface through which a request for downloading a segment is intended to be sent out by said terminal,
      said at least one piece of information on distribution of download requests being obtained by the terminal from an apparatus of the data network and indicating for each network interface a proportion of requests for downloading segments of the audiovisual content to be transmitted by said terminal via said network interface to anticipate traffic congestion on said download path,
   sending said description file to said terminal.

10. A device for providing a piece of information on multipath downloading of an audiovisual content sub-divided into segments, the providing device comprising:
   a processor configured to transmit the following to a terminal:
   a description file comprising:
      at least two pieces of information respectively representative of two segment download paths, each piece of information representative of a download path being associated with a network interface, at least two of the network interfaces being distinct, the at least two pieces of information representative of two segment download paths enabling the terminal, as a function of at least one piece of information on distribution of download requests, to select a network interface through which a request for downloading a segment is intended to be sent out by said terminal, said at least one piece of information on distribution of download requests being obtained by the terminal from an apparatus of the data network and indicating for each network interface a proportion of requests for downloading segments of the audiovisual content to be transmitted by said terminal via said network interface to anticipate traffic congestion on said download path.

11. The device for providing according to claim 10, wherein the processor is also configured to transmit said information on distribution of requests for downloading segments by network interfaces to the terminal.

12. A device for providing a piece of information on distribution of requests for downloading, from a content provider device, an audiovisual content sub-divided into segments, the device being distinct from the content provider device and comprising:
  a processor configured to transmit the following to a terminal adapted to downloading said audiovisual content:
  pieces of information on distribution of requests for downloading segments of the audiovisual content by network interface indicating for each network interface a proportion of requests for downloading segments to be transmitted by said terminal via said network interface to anticipate traffic congestion on said download path, and enabling the terminal to select a network interface through which a request for downloading a segment is intended to be sent out by said terminal.

13. A non-transitory computer-readable medium comprising a computer program stored thereon comprising instructions for implementing a method for downloading an audiovisual content from a data network, when the program is executed by a processor of a terminal, wherein the instructions configure the terminal to perform acts comprising:
  receiving a description file describing a sub-dividing of the audiovisual content into a set of segments, the description file comprising at least two pieces of information representative of respectively two segment download paths, each piece of information representative of a download path being associated with a network interface, at least two of the network interfaces being distinct,
  obtaining at least one piece of information on distribution of requests for downloading segments of the audiovisual content by network interface indicating for each network interface a proportion of requests for downloading segments to be transmitted by said terminal via said network interface to anticipate traffic congestion on said download path, which is obtained from an apparatus of the data network; and
  for at least one segment of the audiovisual content to be downloaded:
    selecting a network interface of the terminal from among the network interfaces associated with the download paths comprised in the description file, as a function of the information on distribution of requests obtained, and
    sending a request for downloading said segment via the selected network interface.

* * * * *